No. 737,296. PATENTED AUG. 25, 1903.
S. M. TAYLOR.
TESTING MACHINE.
APPLICATION FILED JULY 30, 1902.
NO MODEL. 4 SHEETS—SHEET 1.
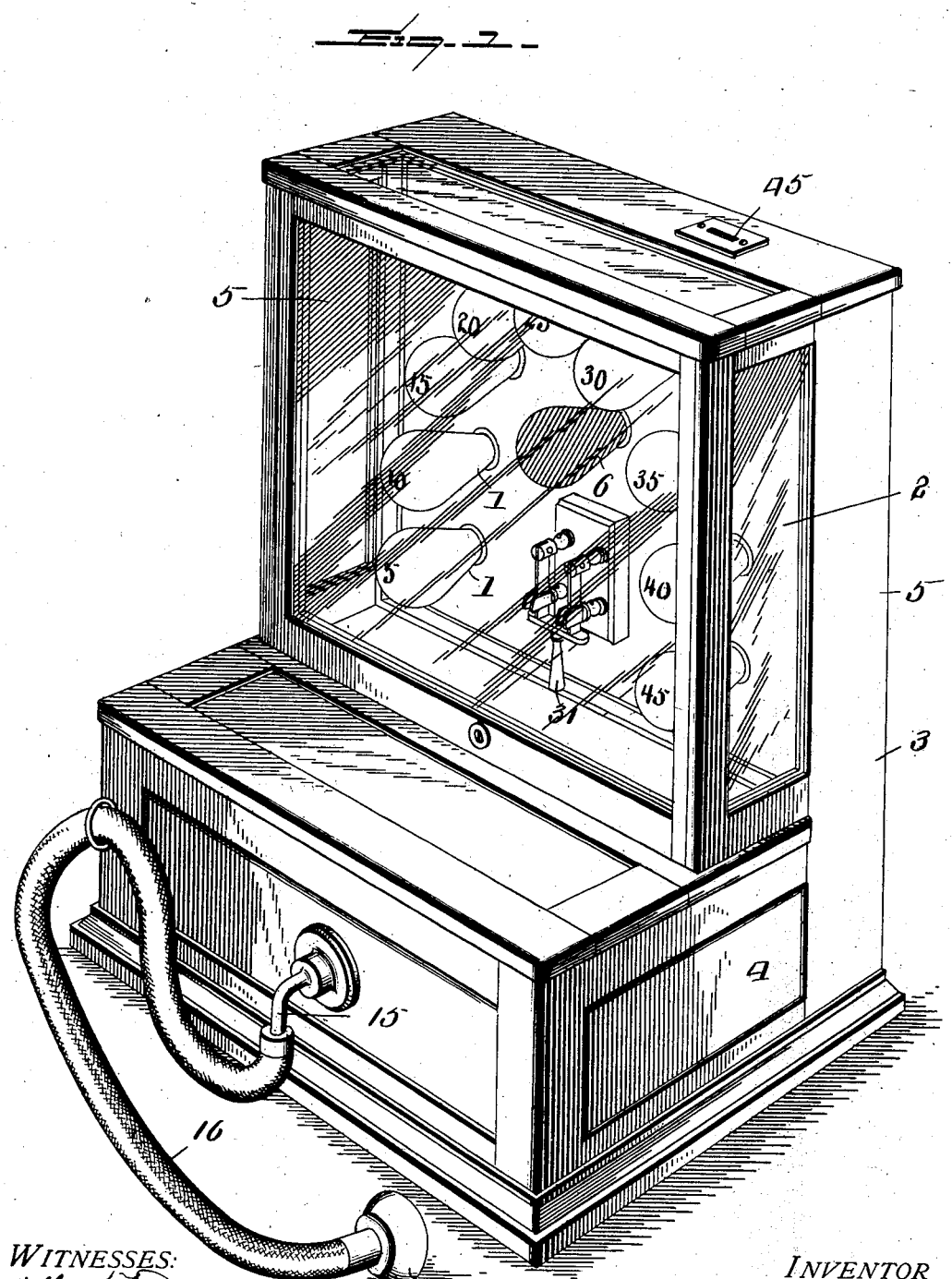
WITNESSES:
W. F. Doyle.
G. S. Roy.
INVENTOR
Santley M. Taylor.
BY
Grover & Co.
Attorneys

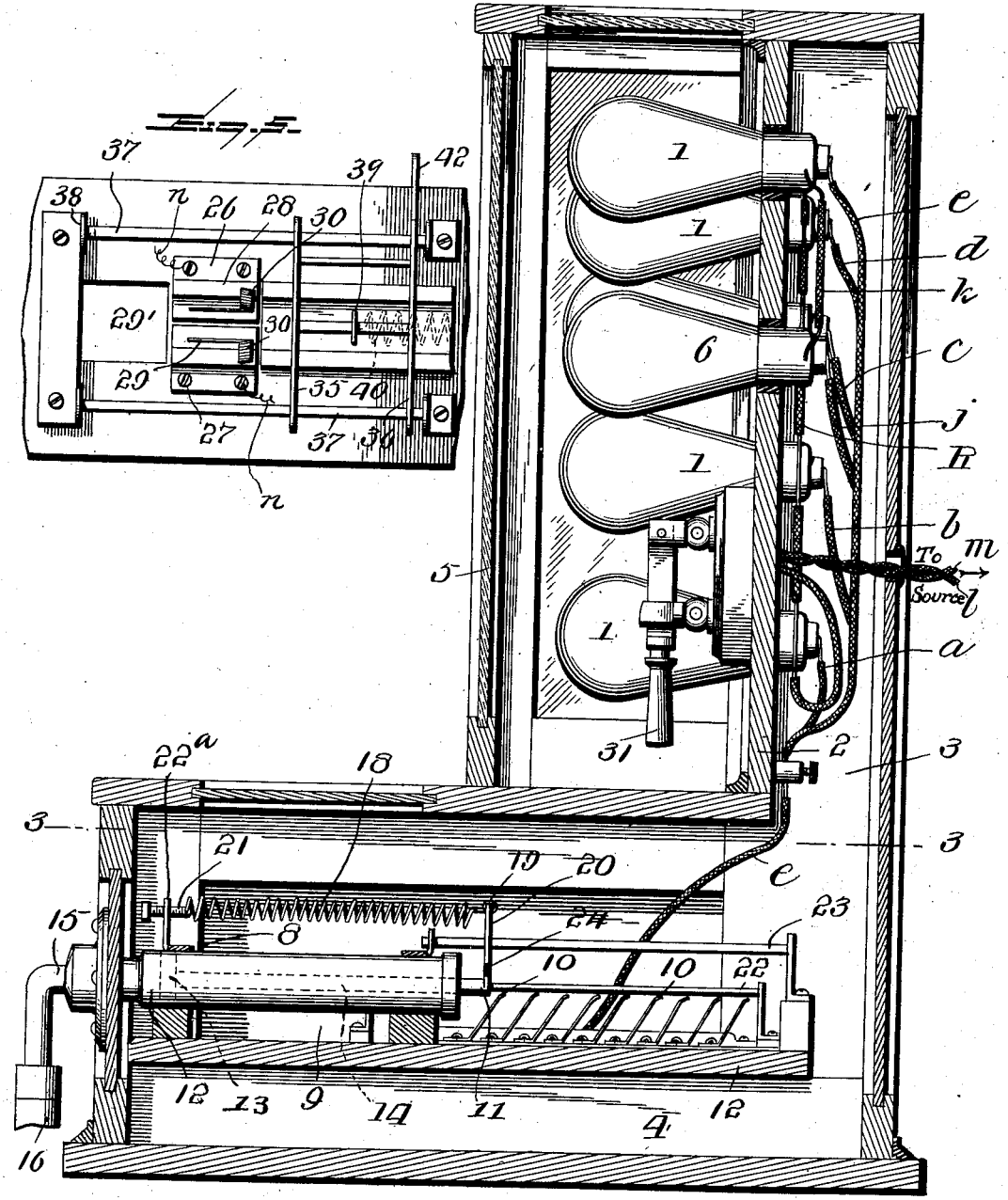

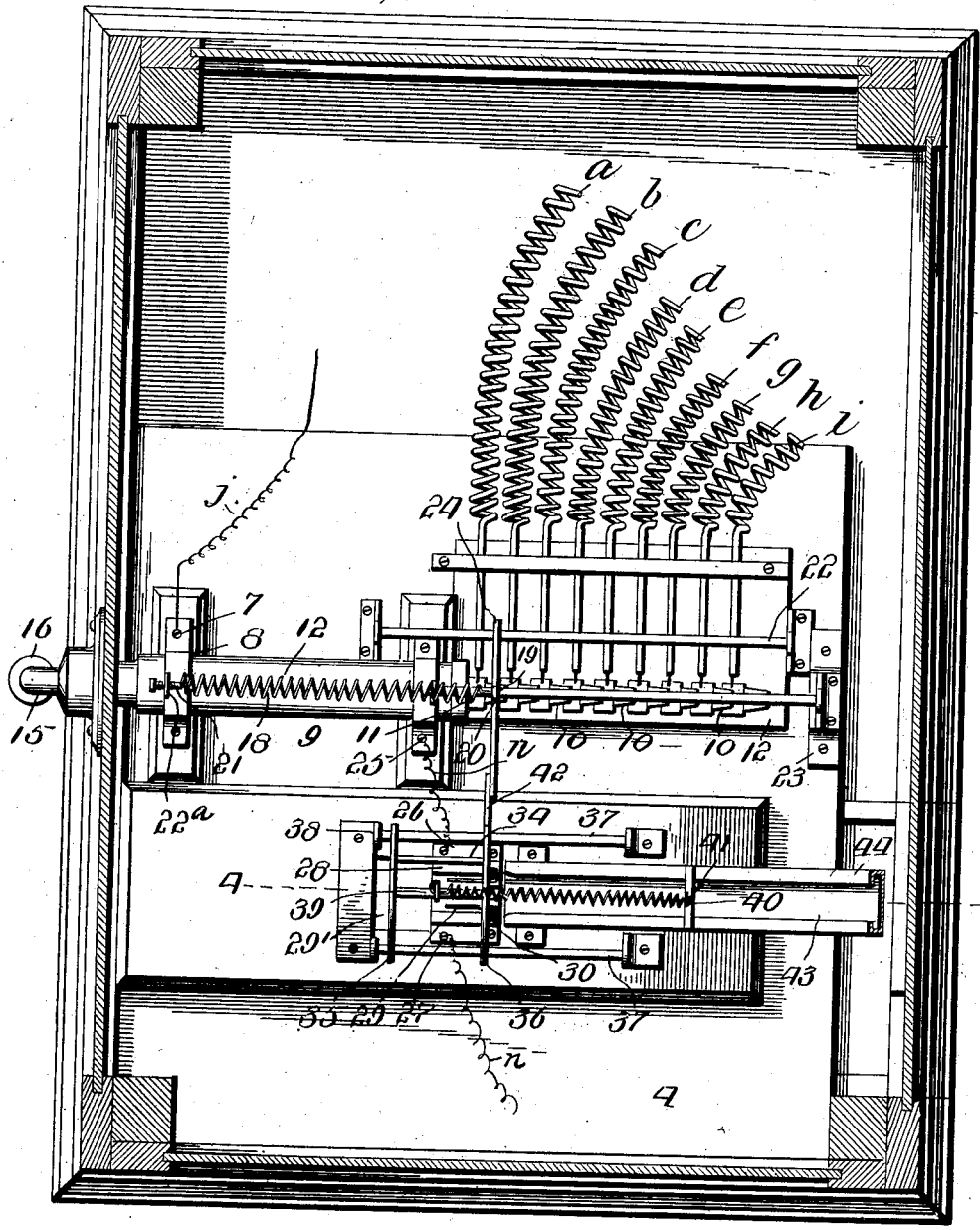

No. 737,296. PATENTED AUG. 25, 1903.
S. M. TAYLOR.
TESTING MACHINE.
APPLICATION FILED JULY 30, 1902.
NO MODEL. 4 SHEETS—SHEET 4.
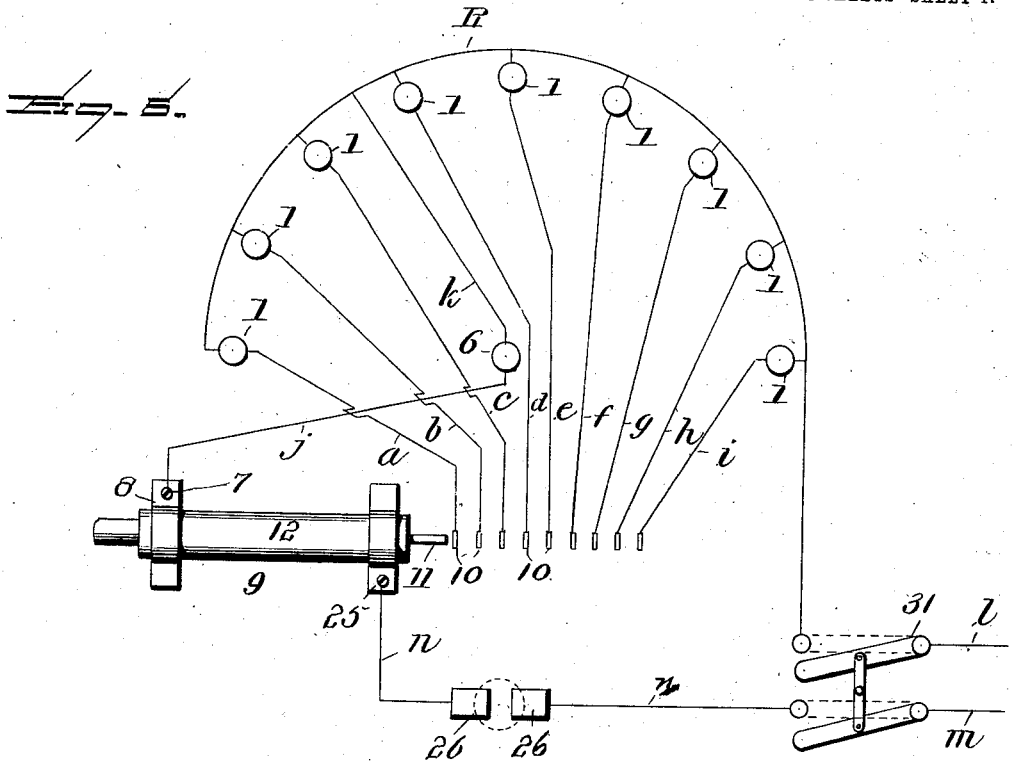
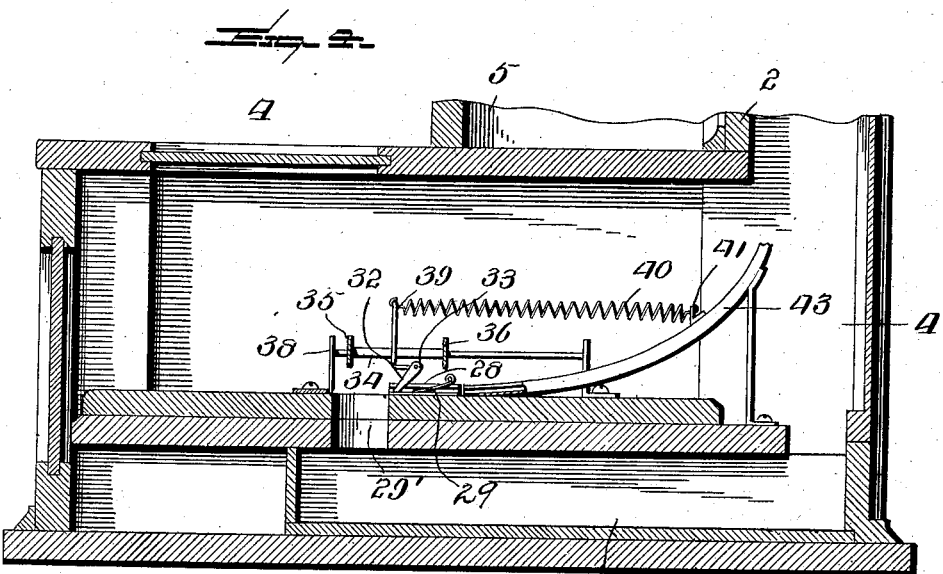
WITNESSES: INVENTOR
Wm. F. Doyle Santley M. Taylor.
G. S. Roy BY
Grover & Co
Attorneys No. 737,296. Patented August 25, 1903.

UNITED STATES PATENT OFFICE.

SANTLEY M. TAYLOR, OF WASHINGTON, DISTRICT OF COLUMBIA, ASSIGNOR OF SEVEN-EIGHTHS TO HARRY C. GROVE, ELMER E. CURRY, CHARLES M. MERRILL, AND ANNIE F. HILLS, OF WASHINGTON, DISTRICT OF COLUMBIA.

TESTING-MACHINE.

SPECIFICATION forming part of Letters Patent No. 737,296, dated August 25, 1903.

Application filed July 30, 1902. Serial No. 117,683. (No model.)

*To all whom it may concern:*

Be it known that I, SANTLEY M. TAYLOR, a citizen of the United States, residing at Washington, District of Columbia, have invented certain new and useful Improvements in Testing-Machines; and I do hereby declare the following to be a full, clear, and exact description of the invention, such as will enable others skilled in the art to which it appertains to make and use the same.

This invention relates to testing-machines of that class which are designed for testing and measuring the strength of a person in various ways—such, for instance, as the force of a blow, the strength of pull or lift, the strength and capacity of the lungs, &c., but refers more particularly to machines of this character technically known as "spirometers," and more commonly called "lung-testers."

To this end the invention has in view a practical, effective, and attractive type of machine possessing special utility as a tester for the lungs and which is preferably operated in conjunction with coin-controlled mechanism whereby a prepayment is required before the machine is rendered available for testing purposes.

One of the main objects of the invention is to provide a testing-machine of the character noted embodying a minimum number of working parts and which shall always be reliable and effective in operation. In this connection the invention has in view a prime actuator or pressure-operated device embodying a variable resistance, whereby lung-power of different strengths may be accurately indicated; also, to provide a prime actuator or pressure-operated device constituting a part of a series of circuit-closing devices for individually and separately controlling a succession of separate indicators which are designed to indicate a difference of strength.

A further object of the invention is to provide a spirometer or lung-tester of an electrical type and embodying a very attractive arrangement or grouping of indicators for indicating the various strengths of lung-power.

A still further object in connection with the indicating feature of the machine or apparatus is to provide improved annunciating means for announcing or showing that the apparatus is in a working condition from the time it is set for operation until it has been worked by a person.

With these and many other objects in view, which will more readily appear as the nature of the invention is better understood, the same consists in the novel construction, combination, and arrangement of parts, which will be hereinafter more fully described, illustrated, and claimed.

The essential features of the invention involved in the special objects above indicated are necessarily susceptible to a wide range of modification without departing from the spirit or scope of the invention; but a preferred embodiment of the latter is shown in the accompanying drawings, in which—

Figure 1 is a perspective view of a spirometer or lung-testing machine constructed in accordance with the present invention. Fig. 2 is a vertical sectional view thereof, the line of section being at one side of the prime actuator or pressure-operated device, which also constitutes a part of the succession of circuit-closers associated with the working circuits for the indicators. Fig. 3 is a horizontal sectional view on the line 3 3 of Fig. 2, exposing in plan the prime actuator, the succession of circuit-closers for the working circuits, and a preferable form of coin-controlled circuit-maintainer. Fig. 4 is a vertical sectional view on the line 4 4 of Fig. 3, showing the preferable construction of temporary circuit-maintainer, some type of which is necessary to render the machine commercially useful. Fig. 5 is an enlarged detail plan view of the said temporary circuit-maintainer. Fig. 6 is a diagrammatic view of the electrical parts of the apparatus, showing a practical arrangement of the various circuits.

Like reference characters designate corresponding parts in the several figures of the drawings.

In carrying out the invention one of the distinctive features thereof resides in the employment of a series or group of separate and independent test-indicators which are separately brought into action according to the strength or force expended upon the prime actuator, and which indicators are designed to be exposed in an attractive or artistic grouping, so as to not only plainly show the indications, but also to command and attract attention.

While various types of indicators may be employed for the purpose indicated, the preferable form, as shown in the drawings, consists of the electric incandescent or glow lamps, which by reason of their form and variously-colored globes may be tastefully grouped in artistic arrangement, while at the same time presenting a most attractive form of indicator when the electric current is passed therethrough. The electrical form of machine or apparatus is therefore the preferable one utilized in carrying out the improvements contemplated.

Referring particularly to the drawings, the series of electric lamps constituting the individual test-indicators are designated by the numeral 1, and each of these lamps or indicators represents one number of any scale of indications that may be determined upon for the purpose of indicating different strengths of lung-power, and while the manner of exposing the indications is susceptible to wide modification an ornamental arrangement is shown in the drawings and consists in placing on the individual lamps the particular number or indication which they represent, so that such number will be exposed when the current causes the lamp to glow.

The series or succession of test-indicating lamps or test-indicators 1 may be arranged or supported in any desired manner. They may be grouped into various figures and the separate lamps may be of variously-colored globes; but in all cases each lamp bears a separate number or indication, and there is necessarily a succession of these lamps or indicators which are successively harder to be set into action. For illustrative purposes one way of arranging the electric lamps or indicators is shown as consisting in grouping them in horseshoe formation upon an indicator-supporting base 2, associated with a machine-cabinet 3. This machine-cabinet may be constructed in any desired manner, according to the preferable arrangement of the test-indicators and the different mechanism coöperating therewith; but in the construction shown in the drawings the cabinet is illustrated as consisting, essentially, of the box base portion 4 and an upright exhibiting-case 5, having glass sides and front, with the group of electric lamps or indicators 1 freely exposed therein. In this construction of cabinet the indicator-supporting base 2 is arranged in an upright position within the back portion of the exhibiting-case 5.

The successive series or group of test-indicators or lamps 1 are fitted to or mounted upon the supporting-base 2 therefor in any approved manner acceptable to the fire-underwriters, and in addition to the series of lamps constituting the test-indicators there is associated with the same an extra or additional lamp 6, which constitutes the annunciating-indicator for the apparatus for showing the machine or apparatus to be in working condition until one or more of the test-indicating lamps 1 have been operated in the manner to be fully explained.

The test-indicating lamps 1 are separately and individually energized. This is preferably accomplished through the medium of a plurality of working circuits, including a common return-wire R and respectively having the main-circuit wires $a$, $b$, $c$, $d$, $e$, $f$, $g$, $h$, $i$, and others, according to the number of test indicators or lamps 1. Each of the main working circuits $aR$ $bR$ $cR$, &c., have the separate wires thereof connected to the terminals of one of the test indicators or lamps 1, so that each lamp has its own working circuit, and in connection with the separate working circuits for the test indicators or lamps 1 it should be noted at this point that the extra or additional lamp 6, which constitutes an annunciating-indicator, also has an independent working circuit, including the main-circuit wires $j$ $k$ and the said common return R, said main-circuit wires of the annunciating indicating-circuit being connected with the terminals of the lamp 6, and one of the said wires, conveniently designated as the wire $j$, has a permanent metallic connection 7 with a metallic part 8 of the prime actuator, which is designated in its entirety by the numeral 9.

The plurality of working circuits for the test indicators or lamps are normally open and have associated therewith a succession of circuit-closers consisting of an alined series of upstanding contact-springs 10 and a traveling or movable contact 11, having a travel within the longitudinal plane of the alined series of said springs and movable into successive contact therewith. The springs 10 are of duplicate construction and arranged in regularly-spaced order upon a suitable supporting-base 12, mounted within the box portion 4 of the cabinet. There are necessarily the same number of said contact-springs 10 as there are test-indicating lamps and working circuits therefor; but irrespective of the number of contact-springs the traveling or movable contact 11 is common to the entire series and serves to close all of the separate circuits. It is preferable in the carrying out of the invention that the said traveling contact 11 form a part of the prime actuator 9.

In this aspect of the machine as a lung-tester or spirometer the prime actuator 9 is in the form of a pressure-operated device, 13 which is actuated by the pressure or force of air from the lungs of a person, and a simple construction of the prime actuator is shown in the drawings and consists of an air-cylinder 12 and an operating-piston or piston-head 13 therein. The said operating-piston or piston-head 13 is connected to one end of the piston-stem 14, working through one end of the cylinder 12 and whose outer end or extremity constitutes the traveling or movable contact 11 referred to. The opposite end of the air-cylinder 12 has fitted thereto an air-pipe fitting 15, suitably secured to the front of the cabinet and preferably having attached thereto a flexible blow-tube 16, carrying at its outer end a suitable mouthpiece 17, which is placed to the mouth of the person using the machine or apparatus. In order to provide for a graduated action or movement of the operating-piston 13 according to the strength of a person's lungs, there is associated with said piston a suitable variable resistance. This preferably consists of a retractile spring 18, arranged exterior to the air-cylinder and having a connection at one end, as at 19, to the pull-arm 20, projected from the outer end of the piston-stem 14, and the other end of the said spring 18 is connected with an adjusting device 21, preferably in the form of a screw mounted in a supporting-bracket $22^a$ on or adjacent to the air-cylinder. By adjusting this screw or device 21 the tension of the spring 18 may be varied to set the machine to work at different strengths; but under all conditions it will be observed that as the spring 18 is drawn out under the movement of the piston 13 the resistance to such movement of the piston 13 is necessarily increased, thereby making it progressively more difficult to energize the separate test-indicating lamps. It is also preferable in the carrying out of the invention to steady the reciprocatory movement of the piston-stem 14 and to relieve it from strain in the end of the cylinder through which it works. This is accomplished by properly guiding the piston-stem, and a simple construction for this purpose is illustrated as consisting of a pair of parallel guide-rods 22 and 23, mounted in suitable supports upon the base 12 and slidably engaged by the cross-arm 24, carried at the outer contact end of the piston-stem 14. Normally, under the influence of the spring 18 the piston is retracted to its initial position with the traveling contact 11 out of engagement with the first of the series of contact-springs 10, Fig. 2. All of the working circuits for the test-indicators are therefore open or broken. The machine is connected up with any suitable source of electrical energy sufficient to energize the electric lamps, and in the construction shown the return-wire may be connected with one lead $l$ from a source of electrical energy, while the other lead-wire $m$ from the same source has a direct or branch wire connection $n$, Fig. 6, with a point of attachment 25 in metallic circuit or connection with both the traveling contact 11 and the permanent contact 7 for the wire $j$ of the annunciating-indicator circuit. In the arrangement of wires shown in the drawings the metallic parts of the prime actuator 9 are utilized for the connections referred to. With a current-supply circuit thus established and in true working condition a circuit will necessarily be established to energize the annunciating-indicator 6, such circuit being completed by the coin through the wires $n$, the metallic cylinder 12, wire $j$, lamp 6, wire $k$, return R, and lead $l$. The establishment of this circuit by the glowing or lighting of the lamp 6 announces or indicates that the apparatus is in operative condition, so that it only becomes necessary for a person to blow through the tube 16 and force out the piston 13 as far as possible. In the outward movement of the piston the traveling contact 11 first energizes the first of the series of contacts 10, thus completing the first working circuit—viz., wire $m\ n$, contact 11, first contact 10, wire $a$, first lamp 1, return R, and lead $l$. As the person is capable of moving the piston farther out, the traveling contact 11 becomes successively engaged with the different contact-springs 10 for the separate working circuits, thus successively throwing the separate lamps into action to give different indications, according to the power or strength of the lungs. When the person releases the lung-pressure, the spring 18 sharply retracts the piston, and thereby automatically opens or breaks all of the working circuits which have been closed with the exception of the working circuit for the annunciating-signal 6. In connection with the operation described it should be observed that the traveling contact 11 as it moves into successive engagement with the different contacts 10 maintains contact with all of the previously-engaged springs 10, thus causing all of the lamps which are energized to remain lighted until the lung-pressure is removed.

In the practical carrying out of the invention it is necessary to provide suitable means whereby the annunciating-signal 6 will only be caused to glow when it is desired to use the apparatus and the current-supply circuit will be broken when the machine is thrown out of use. This is accomplished through the medium of a temporary circuit-maintainer, which is preferably of a coin-controlled form in order that the machine can be made of prepayment or coin-in-the-slot type. While different types of temporary circuit-maintainers may be employed for carrying out this part of the invention for illustrative purposes, the preferable form is disclosed in the present case, although claims thereto are made the subject-matter of a separate companion application filed of even date herewith. The temporary circuit-maintainer shown in the drawings essentially consists of a coin-switch of the type known as "coin in circuit" and primarily consisting of a pair of duplicate oppositely-arranged fixed contact members 26. These contact members are arranged in spaced contacting relation and secured fast by screws or equivalent fastening means 27 to a suitable support within the box portion of the cabinet 3. These spaced fixed contact members are provided on the upper sides thereof with the inturned flanged coin-guides 28, which are adapted to receive the edges of the coin designed to coöperate with the said contact members to complete the current-supply circuit. The guideways provided by the flanged inturned guides 28 are open at both ends, so as to receive the coin at one end and permit of its discharge at the other through the drop-opening 29', which serves to deliver the used coin into the money-drawer or till 29ª, suitably arranged within the bottom portion of the cabinet and removable or replaceable in any desired manner.

In conjunction with the separate fixed contact members 26 of the circuit-maintainer or coin-switch there are preferably employed coin holders or retainers 29. One of these coin holders or retainers 29 is associated with each of the contact members 26 and essentially consists of a spring-arm having a coiled section 30, secured fast to the contact member or plate 26 and serving to normally press the spring-arm in a downward direction to engage the upper side of the coin and hold it in firm metallic contact within the flanged guides of the fixed members until the coin has served its purpose and the same is ready for ejectment or discharge into the opening 29'. In connection with the wiring of the machine the coin-switch described is interposed in the line of one of the leads and has connected, respectively, to the separate contact members 26 thereof the separate branches of the lead-wire $m\ n$. Also it may be desirable to associate with the main leads $l\ m$ a two-point or other type of cut-out switch 31, which may be used to throw the machine entirely in or out of action. When the coin has served its purpose in connection with the other members of the coin-switch or circuit-maintainer, the invention contemplates means for automatically ejecting it out of engagement with the said contact members 26. This is preferably accomplished through the medium of an ejecting-dog 32. This ejecting-dog is of a pendent trailing type, having the point end thereof arranged to move into the plane of and between the opposite fixed contact members 26 and having its upper end pivotally connected at 33 with a carrying-frame 34. This carrying-frame may be of any suitable construction, but is generally of the form shown, and consists of suitably-connected cross-bars 35 and 36, slidably mounted upon fixed guide-rods 37, arranged in opposite parallel relation and supported at their ends in upstanding brackets 38, mounted upon the base supporting the circuit-maintainer or coin-switch. The carrying-frame 34 has a reciprocatory or sliding movement upon the guides or guide-rods 37 and is provided with an upstanding adjusting-arm 39, at the lower end of which is preferably pivotally hung the said dog 32 and to the upper end of which is connected one end of an adjusting-spring 40, the other end of which spring is connected to a fixed point of attachment, as at 41, thus providing means for normally drawing the carrying-frame 34 in a direction away from and in rear of the coin-switch. To provide means for actuating or moving the dog-carrying frame 34 in an opposite direction for ejecting the coin from the fixed switch members, an operative engagement is provided for between the said carrying-frame and the outer contact end of the piston-stem 14. This preferably consists of a tappet-arm 42, Fig. 3, extended from any of the cross-bars of the said frame and lying in the path of any one of the cross-arms 24, carried by the said piston-stem. It will be obvious that when the piston-stem with its traveling contact 11 moves out over the series of contact-springs 10 the carrying-frame 34 necessarily follows this movement under the influence of its adjusting-spring 40; but upon the return movement of the piston under the influence of the spring 18 the superior strength of said spring 18 causes the cross-arm 24 to pull against the arm 42 of the dog-carrying frame, thus moving the said frame toward the coin-switch and causing the point of the dog carried thereby to move forcibly against the coin and eject it from the members holding the same. This action throws the coin out of the fixed switch members, and thereby opens the current-supply circuit, thus preventing further operation of the apparatus until a new coin is introduced into the coin-chute 43. The coin-chute 43 essentially consists of an open guideway or plate having the inturned guiding-flanges 44 at the side edges thereof, and the innermost end of said chute terminates directly adjacent to the coin-switch, with the flanges 44 thereof in register with the flanged guides 28 of the switch members 26, thus providing a continuous guideway for the coin directly into the said members 26 of the coin-switch. The other end of the coin-chute 43 leads in any suitable manner to the coin-slot 45, exposed in a convenient position upon the cabinet for the introduction of a coin or check of proper value. By reason of having the dog 32 pivotally supported at an angle it will be obvious that the same readily trails back over a coin which has passed into the fixed members of the coin-switch. When the coin is thus introduced and passes into the switch members, a circuit is established through the annunciating-signal 6, thus indicating that the apparatus is set ready for operation.

In the operation of the present apparatus a coin is dropped into the coin-slot 45 in the top of the case or cabinet, from which it passes downwardly through the coin-chute 43 until it lodges upon the contacts 26, bridging the space therebetween and closing the circuit of the annunciating-lamp 6, whereby said lamp is caused to glow, and thus indicate that the apparatus is in working condition. The operator then blows into the mouthpiece 17, and thereby forces the piston 13 and its stem 14 outwardly, the traveling contact 11 being caused to successively wipe over the elastic contacts 10, and hence successively close the circuits $a$ to $i$ or at least some of said circuits, according to the lung-power of the operator. When the piston-stem contacts with the first of the series of contacts 10, the lamp in the circuit $a$ will glow, and as the stem is forced farther out it engages the next successive contact 10, and the lamp in circuit $b$ is caused to glow, and so on, according to the lung-power of the operator, it of course being understood that the stem remains in contact with the contacts 10, which it has engaged, and hence such lamps as are engaged remain in glow so long as the pressure is maintained upon the piston. When the pressure is removed from the piston by the operator removing the mouthpiece 17 from his mouth, the piston and stem will be retracted by the spring 18, and thereby also be drawn out of engagement with the contacts 10, which results in the extinguishing of the test-lamps. Simultaneously with the extinguishment of the last lamp, or that in circuit $a$, the annunciating-lamp 6 is also extinguished by reason of the opening of the circuit thereof occasioned by the displacement of the coin from the contact 26 to the coin-drawer by the dog 32, which is operated by the return movement of the piston-stem, as hereinafter set forth.

From the foregoing it is thought that the construction, operation, and many advantages of the herein-described testing-machine will be readily apparent without further description, and it will also be understood that various changes in the form, proportion, and minor details of construction may be resorted to without departing from the spirit of the invention or sacrificing any of the advantages thereof.

Having thus described the invention, what is claimed, and desired to be secured by Letters Patent, is—

1. In a testing-machine of the class described, the combination of a series of test-indicating electric lamps having individual normally open circuits, pressure-operated means for successively closing the said circuits to energize the lamps, and means controlled by said pressure-operated means for automatically throwing all of the circuits out of action when pressure is relieved from the pressure-operated means.

2. In a testing-machine of the class described, the combination of a series of test-indicating electric lamps having individual normally open circuits, an annunciating electric lamp having a normally open circuit including means whereby said circuit may be closed and maintained closed independently of the test-lamp circuits, pressure-operated means for successively closing and maintaining closed the test-lamp circuits, and means controlled by the pressure-operated means for automatically throwing all of the circuits out of action when pressure is relieved from the pressure-operated means.

3. In a testing-machine, a series of test-indicating electric lamps, a plurality of separate working circuits, one for each lamp and including a circuit-closing contact-spring, the contact-springs for the several circuits being arranged in spaced relation and in an alined row, a pressure-operated device consisting of cylinder and piston members, the piston member carrying a traveling contact arranged to successively engage with the separate contact-springs, and one and the same means for varying the resistance to the piston in one direction and also for automatically retracting it to an at-rest position.

4. In a testing-machine, a series of independent test-indicating electric lamps, a plurality of separate working circuits for the individual lamps, each of said circuits including a fixed contact-spring, all of which contact-springs are arranged in spaced relation in a row, an air-cylinder having an exterior blow-tube connection therewith, an operating-piston working within the cylinder and having a stem whose outer end constitutes a traveling contact for the series of contact-springs, said piston-stem also being provided with a pull member and a guided member, guides for the said guided member of the piston-stem, and an adjustable spring connected with said pull member and constituting a variable resistance for the piston, and suitable current-supply circuit connections.

5. In a testing-machine of the class described, the combination with two electric leads, of a series of independent test-indicating electric lamps connected to one of the leads, pressure-operated means connected to the other lead for successively closing and maintaining closed the circuit through both leads and the test-indicating lamps, an annunciating-lamp connected to the first-mentioned lead and to the pressure-operated means, means included in the other lead whereby the circuit may be closed and maintained closed through the two leads, the pressure-operated means, and the annunciating-lamp to set the machine in operative condition prior to the closing of the test-lamp circuits, and means controlled by the pressure-operated means for simultaneously throwing all of the circuits out of action when pressure is relieved from the pressure-operated means.

6. In a testing-machine of the class described, the combination with two electric leads, of a series of test-indicating electric lamps connected to one and the same lead and also having independent contacts, an annunciating electric lamp connected to both leads and independent of the test-indicating lamps, means included in the other lead for closing and maintaining closed the circuit through said leads and the annunciating-lamp independently of the test-indicating lamps, pressure-operated means included in the connection between the annunciating-lamp and the circuit-closing means therefor, and including a traveling contact for successive engagement with the contacts of the test-indicating lamps for closing and maintaining closed the circuits thereof, when the annunciating-lamp is energized, and means controlled by the pressure-operated means for simultaneously throwing all of the circuits out of action, when pressure is relieved from said pressure-operated means.

In testimony whereof I affix my signature in presence of two witnesses.

SANTLEY M. TAYLOR.

Witnesses:
S. A. TERRY,
JAS. E. EVANS.